UNITED STATES PATENT OFFICE.

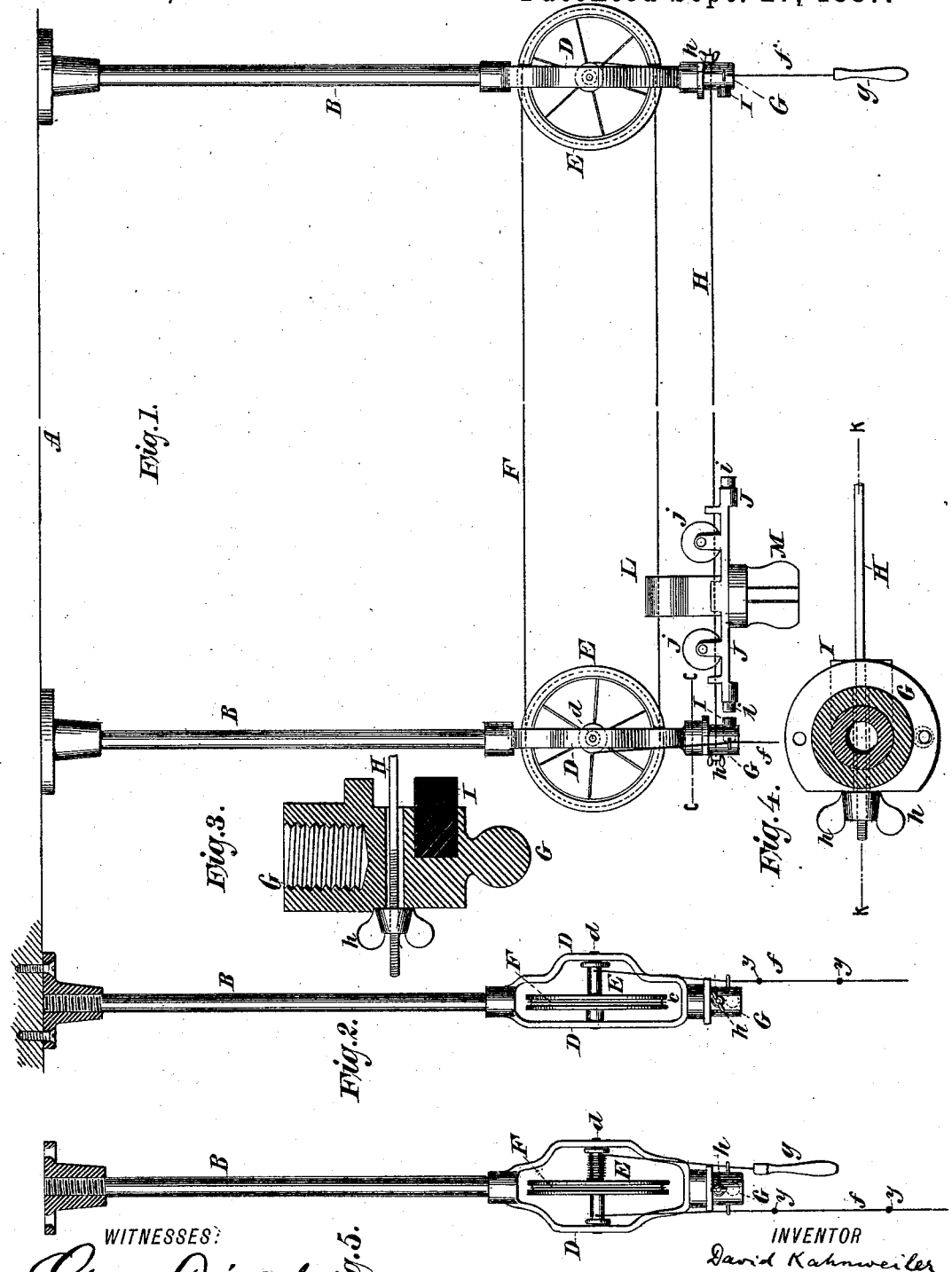

DAVID KAHNWEILER, OF NEW YORK, N. Y.

CASH-CARRIER.

SPECIFICATION forming part of Letters Patent No. 370,627, dated September 27, 1887.

Application filed March 29, 1887. Serial No. 232,861. (No model.)

*To all whom it may concern:*

Be it known that I, DAVID KAHNWEILER, of the city, county, and State of New York, have invented a new and Improved Store-Service Apparatus, of which the following is a specification.

This invention relates to a railway for carrying cash and parcels in stores; and it consists in the combination of a wire or track suspended from two points in the store for carrying cash, &c., mounted upon said track an endless belt or band, wheels situated at both ends of the track, over which the endless belt passes, a friction-clasp carried by the car and engaging the endless belt, and a stop for arresting the car without stopping the endless belt. The wheels carrying this endless propelling belt or band are to be revolved by means of cords secured to their axles or to pulleys on same. To propel the car, the cord secured to and wound upon one of the wheel-axles is unwound therefrom. This moves the endless band, and thereby the car, and winds up the cord on the opposite pulley or axle. To return the car to the starting-place, the cord on this opposite pulley or axle is unwound to move the endless band and the car in the opposite direction. Each time the car is sent along the track the cord on the axle at the end of the track toward which the car is moving will be wound up ready to propel the car back again. When the car is arrested, the endless belt is not stopped, but continues to move, slipping through the clasp. The clasp always remains in position on and in engagement with the endless belt.

Reference is to be had to the accompanying drawings, forming part of this specification, in which—

Figure 1 is a side view of my improved cash-railway system. Fig. 2 is an end view of same. Fig. 3 is a sectional view taken on line $k\ k$, Fig. 4. Fig. 4 is a sectional view taken on line $c\ c$, Fig. 1; and Fig. 5 is an end view of a modification.

To the ceiling A of the room, or to any other support, are secured the rods or uprights B. The free ends of the rods B are preferably looped or forked, as at D, Figs. 2 and 5. In the looped or forked ends D of the two rods B are journaled the wheels E, adapted to receive the endless band or belt F, as shown. Each wheel E is mounted upon an axle, $d$, to which is secured one end of a cord, $f$. Suitably secured to the free end of each rod B is the track-holder and bumper-head G.

H is the track or wire, which may be screw-threaded at one or both of its ends, and preferably passes through the two holders G, as shown, and receives at each threaded end a thumb screw, $h$, which serves to take up any slack in the track and to keep it taut and in position. A piece of rubber or analogous substance, I, is secured to the bumper-head G, on its inner face, to receive the shock from the car or vehicle J, which runs on the track H by means of the wheel $j$ or otherwise. In the ends of the car J are secured the bumpers $i$, corresponding to the bumper I, against which they are to impinge to ease the shock on car J when brought to a standstill.

The car J is connected to the endless propelling belt or band F in any suitable manner, but preferably by means of a projection or friction-clasp, L, secured to the car J. A box or suitable cash or goods receiver, M, is removably or otherwise secured to the car J, into which the articles to be sent are deposited.

In the modification shown in Fig. 5 the wheel E is provided with two cords, $f\ f$, so arranged that when one is wound up the other cord will be unwound, so that if the sender of the car desires to bring it back at any time after or before it has reached the other station he can do so by pulling on the cord which has been winding up while the car was sent.

Instead of securing the rods B to the ceiling, they may be secured to any suitable framework or to the floor, and the wheels E arranged accordingly; or, instead of any of the above modes, the wheels E and connections may be secured to brackets projecting from the wall or a frame-work without departing from the spirit of my invention. By regulating the difference of diameter between the axle $d$, where the cord $f$ is wound upon it, and wheel E, the distance between stations and the speed at which the car is driven may be regulated as best suits the requirements.

At the cashier's or other station any number of tracks H and wheels E and connections may be situated and suitably supported, the tracks converging in any desired direction.

By using the above-described system no springs or devices for propelling the cars violently are needed. By my system the cars are positively moved by unwinding one of the cords $f$. Whenever a car strikes the bumper at one end of the track it is arrested, but the friction-clasp L permits the belt or band F to move along still farther, the rebound of the car on striking the bumper being prevented by the band F still passing through the friction-clasp L, which tends to keep the car pressed against the bumper till all movement of the band ceases. If desired, the track H could be dispensed with and the car J secured to the band F; but I prefer to use the track in connection with the endless band.

The operation of this railway is as follows: Supposing the car to be at one station (see Fig. 1) and the cord $f$ at that station wound up. The clerk at that station now desires to send the car to the other station—say the cashier's desk. He draws upon the cord $f$ near him, revolves the wheel E, and the belt or band F, moving along with wheel E, carries the car J toward the other station. At the same time, by revolving the other wheel E the cord $f$ at the farther station is wound up. The car is brought to a standstill by abutting against the bumper I. The cord $f$ at the starting-station is now unwound. When the person at the receiving-station desires to return the car to the first position, he draws upon his cord $f$, which revolves wheels E, sending the car along the track H and winding the cord $f$ up at the original starting-station. Thus it will be seen that at each sending of the car the cord at the end toward which the car moves will be wound up ready to be drawn upon to send the car back again; but this system can be operated by using only one cord $f$, by giving a quick pull on the cord until it is all unwound from its pulley, thereby revolving wheel E and sending the car J along, and the momentum thus given to the car will carry it along the rest of the track and wind the cord up again, but in direction opposite to its first winding. Then by pulling on said cord the wheel E will be revolved, bringing the car back, and the same operation of unwinding and rewinding said cord $f$ will be gone through with each time the car is sent along the track.

Instead of cords $f$, suitable gearing answering the same purpose may be employed.

By placing certain distinguishing marks upon cords $f$—such, for instance, as buttons or pieces of ribbon of various color—the sender can at all times tell where the car is along the line of the track, and by these means stop it at any one of a series of stations desired near each of a series of salesmen, each station being represented by one of the marks on the cord $f$. In Figs. 2 and 5 these marks are indicated by the enlargements $y$.

Having now described my invention, what I claim is—

1. The combination of the endless band F and the carrying-wheels E E, and means, substantially as described, for moving the same, with the car J, track H, clasp L, carried by the car, which clasp engages the belt F by frictional contact only, and with means, substantially as described, for arresting the car without stopping the belt, the clasp L always remaining in position on and in engagement with the belt, as set forth.

2. The combination of the posts B B, track H, wheels E E, endless belt F, car J, cords $f$ $f$, each of said cords having one end connected to one of the axles of the wheels E E, friction-clasp L, carried by the car J and engaging the belt F, and means, substantially as described, for arresting the car without stopping the belt, the clasp L always remaining in position on and in engagement with the belt to render the car reversible, as specified.

DAVID KAHNWEILER.

Witnesses:
T. F. BOURNE,
HARRY M. TURK.